(12) United States Patent
Romanchok et al.

(10) Patent No.: US 7,925,412 B2
(45) Date of Patent: Apr. 12, 2011

(54) VEHICLE STABILITY SYSTEM WITH MULTIPLE SENSITIVITIES

(75) Inventors: Kevin Romanchok, Avon, OH (US); Cem Hatipoglu, Cambridge, MA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1044 days.

(21) Appl. No.: 11/415,648

(22) Filed: May 2, 2006

(65) Prior Publication Data
US 2007/0260384 A1 Nov. 8, 2007

(51) Int. Cl.
*B60W 30/02* (2006.01)
*B60W 30/04* (2006.01)
*B60T 8/1755* (2006.01)

(52) U.S. Cl. .......................................... 701/82; 701/83

(58) Field of Classification Search ...................... 701/70
See application file for complete search history.

(56) References Cited

U.S. PATENT DOCUMENTS

| | | | |
|---|---|---|---|
| 5,253,931 A | 10/1993 | Koster et al. | |
| 5,383,680 A * | 1/1995 | Bock et al. | 280/5.503 |
| 5,719,565 A | 2/1998 | Tsuno et al. | |
| 6,225,894 B1 | 5/2001 | Kyrtsos | |
| 6,312,066 B1 | 11/2001 | Gronan et al. | |
| 6,324,447 B1 * | 11/2001 | Schramm et al. | 701/1 |
| 6,419,038 B1 | 7/2002 | Hessmert et al. | |
| 6,498,976 B1 * | 12/2002 | Ehlbeck et al. | 701/70 |
| 6,542,805 B1 | 4/2003 | Mergenthaler et al. | |
| 6,937,928 B2 | 8/2005 | Capito | |
| 6,959,970 B2 * | 11/2005 | Tseng | 303/146 |
| 2005/0004730 A1 * | 1/2005 | Suzuki et al. | 701/38 |
| 2005/0140207 A1 | 6/2005 | Goebels et al. | |
| 2005/0206235 A1 * | 9/2005 | Tseng | 303/146 |
| 2005/0217917 A1 * | 10/2005 | Salib et al. | 180/282 |
| 2006/0173584 A1 * | 8/2006 | Einig et al. | 701/1 |
| 2007/0027596 A1 * | 2/2007 | Stavroff et al. | 701/38 |

FOREIGN PATENT DOCUMENTS

| | | |
|---|---|---|
| DE | 10128692 | 12/2001 |
| JP | 200158563 A | 3/2001 |

OTHER PUBLICATIONS

English translation of the Abstract from Japanese Document No. 2001-58563A. The Japanese document is a counterpart of DE 10128692, which was cited in an Information Disclosure Statement submitted on Aug. 14, 2007.
International Search Report and Written Opinion from PCT/US2007/006341, mailed Jul. 31, 2007.
Bendix Electronic Controls, ABS-6 Advanced with ESP Stability System brochure, 2 pgs., Mar. 2005.
Bendix ABS-6 Advanced with ESP Stability System brochure, Frequently Asked Questions to Help You Make an Intelligent Investment in Stability, 14 pgs., Mar. 2005.
Bendix Electronic Controls, robust intelligence, Antilock Braking System, brochure, 12 pgs., 2004.
UMTRI Research Review, Univeristy of Michigan Transportation Research Institute, Oct.-Dec. 2000, vol. 31, No. 4, Rollover of Heavy Commerical Vehicles, 23 pgs.

* cited by examiner

*Primary Examiner* — Thomas G Black
*Assistant Examiner* — Shelley Chen
(74) *Attorney, Agent, or Firm* — Calfee, Halter & Griswold LLP

(57) ABSTRACT

A system and method for providing stability control for a commercial vehicle. The system may include multiple selectable control tuning modes or sensitivities for defining when the system may intervene to provide corrective action to aid vehicle stability. The control tuning modes may be representative of different vehicle configurations/conditions and a source of input data indicative the present configuration/condition of the vehicle may be provided.

12 Claims, 2 Drawing Sheets

VEHICLE STABILITY SYSTEM WITH MULTIPLE SENSITIVITIES

BACKGROUND OF THE INVENTION

Electronic stability control systems are available for use on commercial vehicles such as truck/tractor trailers and buses. These stability systems monitor the dynamic operation of the vehicle and intervene when needed to provide rollover stability or yaw stability.

Rollover stability counteracts the tendency of a vehicle, or vehicle combination, to tip over while turning. The lateral (side) acceleration during turning creates a force at the center of gravity (CG) of the vehicle, "pushing" the vehicle horizontally. The friction between the tires and the road opposes that force. If the lateral force is high enough, and the tire cornering forces has not yet saturated, the centrifugal force on the CG can create rotational moment at the outer wheels. As a result, one side of the vehicle may begin to lift off the ground potentially causing the vehicle to roll over.

Yaw stability counteracts the tendency of a vehicle to spin about its vertical axis. During operation, if the friction between the road surface and the vehicle's tires is not sufficient to oppose lateral forces, one or more of the tires can slide, causing the vehicle to spin.

Electronic stability systems typically utilize an electronic control unit (ECU) that includes system control logic and receives operational information, such as wheel speed, lateral acceleration, yaw rate, and steering angle sensors, from various sensors. The information from these sensors allows the control unit to identify when a stability risk occurs. A single control tuning, which is customized for a particular vehicle family or platform, is typically uploaded to the system ECU at the vehicle manufacturer. For this particular vehicle platform, the single customized control tuning defines which combinations of sensor readings (i.e. intervention thresholds) will result in the ECU taking corrective action due to a calculated stability risk. If the thresholds are exceeded, the system intervenes to assist the driver in maintaining stability.

In addition, some stability system logic may be somewhat adaptive. For example, the system may receive operational information on the vehicle load, such as whether the vehicle is hauling an empty trailer or is hauling a loaded trailer. The adaptive aspect of the system may modify the intervention thresholds for a loaded trailer such that the thresholds may be different than the intervention thresholds for an unloaded trailer. Since the system for a particular vehicle platform has a single customized tuning, however, if the operating conditions are the same, the vehicle intervention thresholds will happen in the same manner (i.e. with the same sensitivity).

In the case of a potential roll event, the system may intervene by overriding the throttle and quickly applying brake pressure at selected wheels to slow the vehicle before the lateral acceleration reaches a critical level. In the case of vehicle slide, the system may reduce the throttle and then brake one or more of the "four corners" of the vehicle (in addition to potentially applying the trailer brakes), thus applying a counter-force to better align the vehicle with an appropriate path of travel.

Some commercial vehicles, however, may be used in a variety of vehicle configurations or conditions, which may result in different vehicle dynamics. For example, a tractor may need to haul a single trailer for one job and haul a double or triple trailer combination for another job. A tractor hauling a double or triple trailer combination may have more tendency to rollover or slide than a tractor with a single trailer under the same dynamic conditions. Since the single tuning of the system is optimized for one vehicle configuration or condition, the stability system may not intervene optimally when the vehicle's configuration or condition is changed. Thus, the safety and drivability of the vehicle may be suboptimal when the vehicle configuration/condition is different.

SUMMARY

The present invention relates generally to a stability system for a vehicle. More particularly, the invention relates to an electronic stability system for a commercial vehicle that may include multiple control tuning modes or sensitivities for defining when the system intervenes to provide corrective action.

In accordance with one aspect of an apparatus applying principles of the present invention, the system may be adapted to receive input data indicative of a vehicle configuration/condition or estimate the vehicle configuration/condition based on input data. In one embodiment of an apparatus applying principles of the invention, an in-cab manual switch provides input data indicative of a vehicle configuration/condition. In another embodiment, a databus signal may include data indicative of a vehicle configuration/condition. In yet another embodiment, the input data may be indicative of one or more of: the type of trailer being hauled, the type of load being carried, and the position of the center of gravity of the load.

In accordance with another aspect of a system applying principles of the present invention, the system may include a plurality of control tuning modes. In one embodiment, the plurality of control tuning modes are preprogrammed and stored in the memory of an electronic control unit. In another embodiment, the system may automatically select an appropriate control tuning mode based on input data received by the system. In a more specific embodiment, a control tuning mode is provided for each of a variety of towed vehicle types being hauled by the commercial vehicle.

These and other aspects and advantages of the apparatus, systems, and methods applying the principles of the present invention will be apparent to those skilled in the art from the following description of the preferred embodiments in view of the accompanying drawings.

BRIEF DESCRIPTION OF THE DRAWINGS

In the accompanying drawing, which are incorporated in and constitute a part of the specification, embodiments of the invention are illustrated, which, together with a general description of the invention given above, and the detailed description given below, serve to exemplify embodiments applying principles of the invention.

DETAILED DESCRIPTION

The present invention contemplates a system, apparatus, and method of providing stability control for a commercial vehicle. The invention may include multiple control tuning modes or sensitivities for defining when the system may intervene to provide corrective action to aid vehicle stability. The control tuning modes may be representative of different vehicle configurations/conditions and a source of input data indicative the present configuration/condition of the vehicle may be provided.

While various aspects and concepts of the invention may be described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Figure 1:
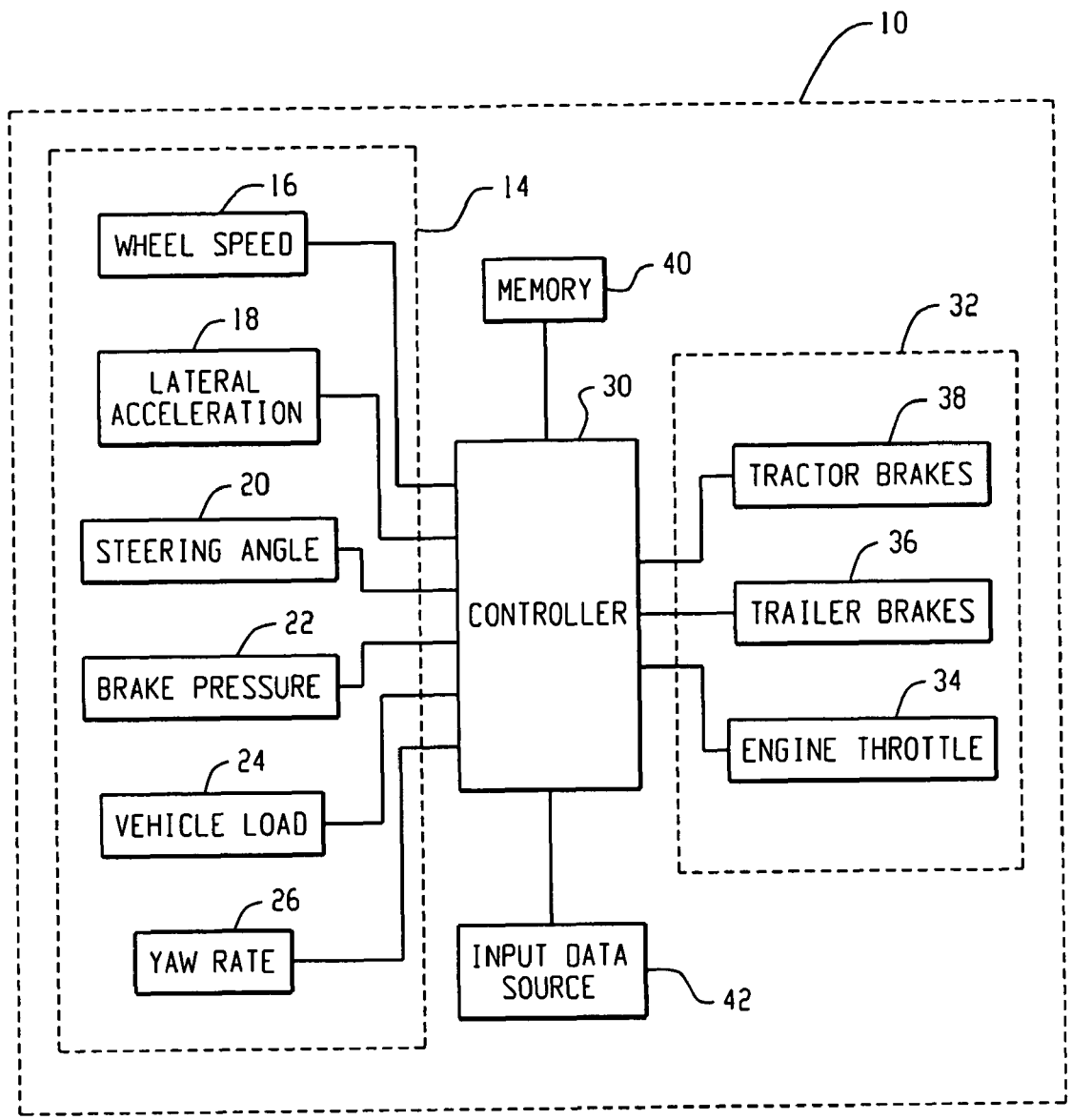
FIG. 1 is a schematic illustration of an exemplary embodiment of a stability system with multiple control tuning modes applying principles of the present invention.

Referring to FIG. 1, a schematic representation of a stability system 10 for a commercial vehicle according to principles of the present invention is illustrated. The system 10 may be adapted to detect and monitor a variety of operational parameters and conditions of the commercial vehicle and intervene to take corrective action as needed to maintain stability. In the exemplary embodiment of FIG. 1, the system 10 may include one or more devices 14 for providing input data indicative of an operating parameter or condition of a commercial vehicle. For example, the devices 14 may be one or more sensors, such as but not limited to, one or more wheel speed sensors 16, a lateral acceleration sensor 18, a steering angle sensor 20, a brake pressure sensor 22, a vehicle load sensor 24, and a yaw rate sensor 26. The system 10 may also utilize additional devices or sensors not described in the exemplary embodiment or combine one or more devices or sensors into a single unit.

The system 10 may also include a logic applying arrangement 30, such as a controller or processor, in communication with the one or more devices 14. The controller 30 may include one or more inputs for receiving input data from the devices 14. The controller 30 may be adapted to process the input data and compare the raw or processed input data to a stored threshold value. The controller 30 may also include one or more outputs for delivering a control signal to one or more vehicle systems 32 based on the comparison. The control signal may instruct the systems 32 to intervene in the operation of the vehicle to initiate corrective action. For example, the controller 30 may generate and send the control signal to an engine electronic control unit or an actuating device to reduce the engine throttle 34 and slowing the vehicle down. Further, the controller 30 may send the control signal to a vehicle brake system to selectively engage the brakes. In a tractor-trailer arrangement, the controller 30 may engage the brakes on one or more wheels of a trailer portion of the vehicle 36 and the brakes on one or more wheels of a tractor portion of the vehicle 38. A variety of corrective actions may be possible and multiple corrective actions may be initiated at the same time.

The controller 30 may also include a memory portion 40 for storing and accessing system information, such as for example the system control logic and control tuning. The memory portion 40, however, may be separate from the controller 30. The sensors 14 and controller 30 may be part of a preexisting system or use components of a preexisting system. For example, the Bendix® ABS-6 Advanced Antilock Brake Controller with ESP® Stability System available from Bendix Commercial Vehicle Systems, LLC may be installed on the vehicle. The Bendix ESP system may utilize some or all of the sensors described in FIG. 1. The logic component of the Bendix ESP system resides on the vehicle's antilock brake system electronic control unit, which may be used for the controller 30 of the present invention. Therefore, many of the components to support the system 10 of the present invention may be present in a vehicle equipped with the Bendix ESP system, thus, not requiring the installation of additional components. The system 10, however, may utilize independently installed components if desired.

The system 10 may also include a source of input data 42 indicative of a configuration/condition of a commercial vehicle. The controller 30 may sense or estimate the configuration/condition of the vehicle based on the input data, and may select a control tuning mode or sensitivity based on the vehicle configuration/condition. The controller 30 may compare the operational data received from the sensors 14 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to applied during corrective action.

A vehicle configuration/condition may refer to a set of characteristics of the vehicle which may influence the vehicle's stability (roll and/or yaw). For example, in a vehicle with a towed portion, the source of input data 42 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the stability system 10 may select a tuning that makes the system more sensitive (i.e. intervene earlier than would occur for a single trailer condition). The control tuning may be, for example, specifically defined to optimize the performance of the stability system for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

Figure 2:
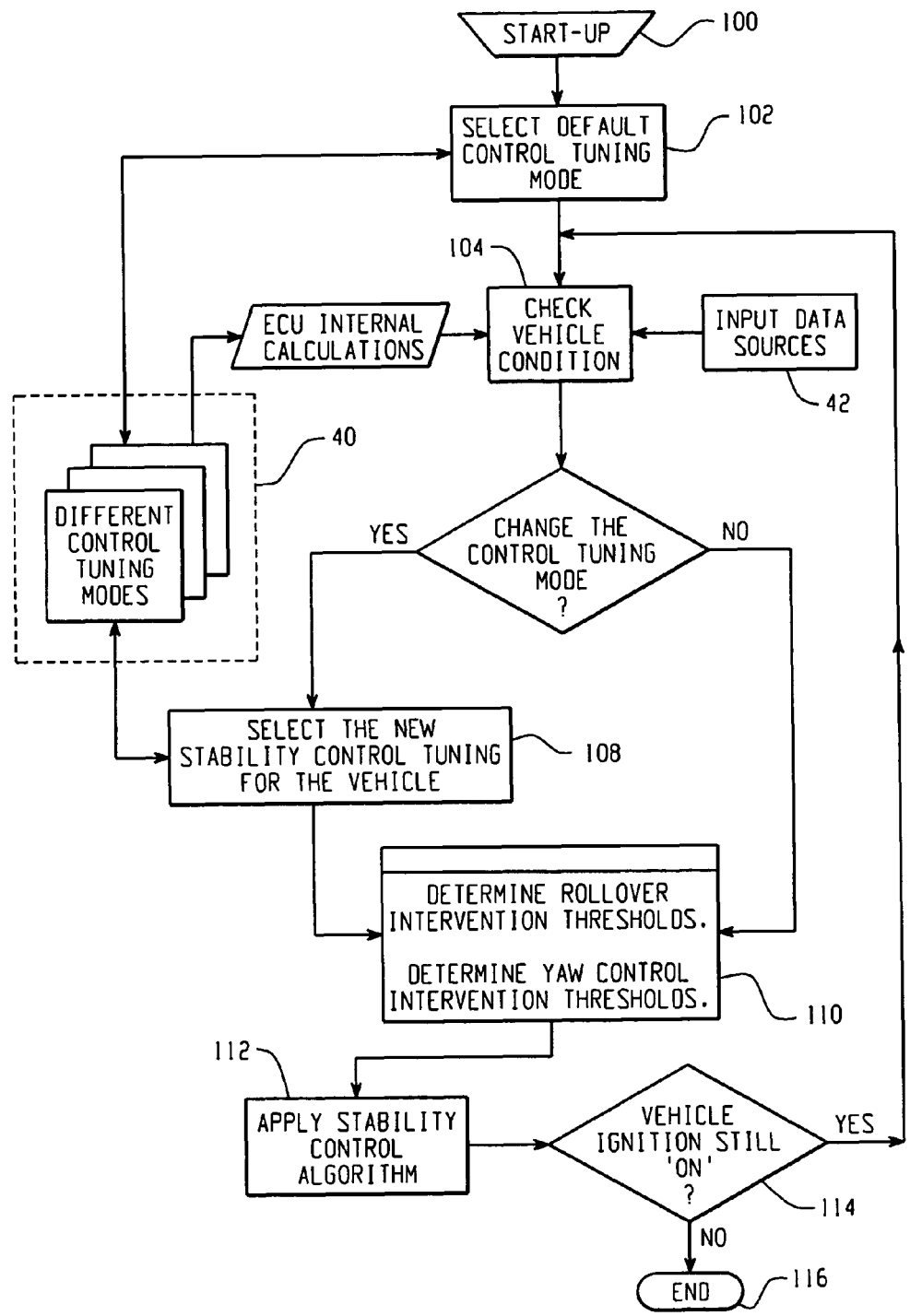
FIG. 2 is a flow chart illustrating the control logic of the system of FIG. 1.

FIG. 2 illustrates a flow chart of an example of a control logic for the stability system of FIG. 1. Upon vehicle start-up 100, the system 10 may select a default control tuning mode 102 from multiple, selectable tuning modes stored in the memory 40 of the system for different types of vehicle configurations or load types. A default tuning mode may be preprogrammed into the logic of the system 10 based on the configuration/condition that the vehicle normally operates in. For example, if the vehicle typically hauls a single trailer with a stationary, centered load, then the tuning mode for the system 10 may be optimized for that particular configuration/condition and set as the default tuning mode for the system.

The system 10 may also check the configuration/condition of the vehicle 104 to determine if the control tuning mode should remain as the default mode or should be changed to another control tuning mode. The system 10 may accomplish this by receiving input data indicative of a vehicle configuration/condition from one or more sources of input data 42. Examples of possible sources for the input data may include, but not be limited to, a manual switch in the cab of the vehicle, a databus message from J2497 power line carrier (PLC) on a trailer or J1939 Controller Area Network (CAN), one or more sensors adapted to provide input data indicative of a vehicle condition, or other possible input data sources. Furthermore, the controller 12 may utilize an estimation algorithm to estimate a vehicle configuration/condition based on one or more vehicle parameters instead of or in combination with any of the methods described above.

If the system 10 determines that the vehicle configuration/condition dictates a change in the control tuning mode, the controller 12 may select one of the multiple control tuning modes stored in memory 40. For example, if the input data indicates that a two trailer combination is being used, the system 10 may select a tuning mode optimized for a two trailer combination. One of ordinary skill in the art will appreciate that the system 10, based on the amount of memory 40 available, may be preprogrammed with as many control tuning modes as desired to reflect various vehicle configurations/conditions.

Once the control tuning mode has been selected, the system 10 may determine the rollover intervention thresholds and yaw control intervention thresholds 110 based on the control tuning mode. These thresholds may then be activated in the stability control algorithm and the control algorithm applied 112 so that when the thresholds are exceeded or predicted to be exceeded, the system 10 will intervene to maintain vehicle stability.

The system 10 may also be programmed to repeatably check for a vehicle condition change. Thus, the system 10 may determine if the vehicle ignition is ON 114. If the ignition is OFF, then control logic may END 116. If, however, the vehicle ignition is ON, then system 10 may loop back to the logic step of checking the vehicle condition 104. For example, the system 10 may include devices to detect if the vehicle load has changed or shifted. Different control tuning may be defined for a stationary load versus a movable loads or a centered load versus an offset load. Therefore, the system 10 may select an appropriate control tuning mode for the configuration/condition detected. For example, more sensitive tuning may be selected to address a movable load or different tunings may be used in a delivery vehicle as the load changes as portions are unloaded at a plurality of delivery locations.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A controller for aiding the stability control of a commercial vehicle, the controller comprising:
    one or more inputs for receiving configuration data indicative of at least two trailers being towed by the vehicle;
    one or more inputs for receiving operational data indicative of a stability risk;
    a logic applying arrangement for selecting one of a plurality of preprogrammed control tuning modes based on the number of trailers being towed, the logic applying arrangement adapted to determine a set of rollover and yaw control intervention thresholds based on the selected control tuning mode, wherein the logic applying arrangement compares the operational data to the set of rollover and yaw control intervention thresholds and generates a control signal representative of a corrective action as a function of the comparison; and
    an output for sending the control signal to an operational system of the vehicle for initiating the corrective action.

2. The controller of claim 1 wherein the corrective action includes braking the vehicle.

3. The controller of claim 1 wherein the corrective action includes reducing throttling of an engine of the vehicle.

4. The controller of claim 1 further comprising a memory portion for storing the plurality of control tuning modes.

5. The controller of claim 1 wherein the operational data includes one or more of: lateral acceleration data, yaw rate data, wheel speed data, and steering angle data.

6. The controller of claim 1 wherein the input receives configuration data indicative of the type of trailers being towed.

7. The controller of claim 1 wherein the commercial vehicle includes a load being hauled, and wherein the input receives configuration data indicative of the location of the center of gravity of the load.

8. A method for providing stability control for a commercial vehicle, the method comprising the steps of:
    receiving input data indicative of at least two towed vehicles;
    selecting one of a plurality of preprogrammed stored control tuning modes based on the number of towed vehicles;
    determining a set of rollover and yaw control intervention thresholds based on the selected control tuning mode;
    implementing the selected control tuning mode; and
    sending a control signal representative of a corrective action.

9. The method of claim 8 further comprising the steps of: receiving operational data indicative of a vehicle stability risk; comparing the operational data to the set of rollover and yaw control intervention thresholds; wherein the step of sending a control signal is based on the step of comparing the operational data to the set of rollover and yaw control intervention thresholds.

10. The method of claim 8 further comprising the step of applying a brake on one or more wheels of a vehicle in response to the control signal.

11. The method of claim 8 further comprising the step of actuating a throttle to reduce the speed of the vehicle in response to the control signal.

12. The method of claim 8 wherein the input data indicative of at least two towed vehicles includes the type of vehicle being towed.

* * * * *